(12) United States Patent
Efstathopoulos et al.

(10) Patent No.: US 11,032,303 B1
(45) Date of Patent: Jun. 8, 2021

(54) CLASSIFICATION USING PROJECTION OF GRAPHS INTO SUMMARIZED SPACES

(71) Applicant: NortonLifeLock Inc., Tempe, AZ (US)

(72) Inventors: Petros Efstathopoulos, Los Angeles, CA (US); Ashwin Kumar Kayyoor, Santa Clara, CA (US)

(73) Assignee: NortonLifeLock Inc., Tempe, AZ (US)

( * ) Notice: Subject to any disclaimer, the term of this patent is extended or adjusted under 35 U.S.C. 154(b) by 352 days.

(21) Appl. No.: 16/134,109

(22) Filed: Sep. 18, 2018

(51) Int. Cl.
*H04L 29/06* (2006.01)
*G06F 16/28* (2019.01)
*G06F 16/901* (2019.01)

(52) U.S. Cl.
CPC ........ *H04L 63/1425* (2013.01); *G06F 16/285* (2019.01); *G06F 16/9024* (2019.01); *H04L 63/1416* (2013.01)

(58) Field of Classification Search
CPC ............. H04L 63/1416; H04L 63/1425; G06F 16/9024; G06F 16/285
See application file for complete search history.

(56) References Cited

U.S. PATENT DOCUMENTS

| | | | | |
|---|---|---|---|---|
| 9,361,463 | B2* | 6/2016 | Ferragut | G06F 21/552 |
| 2015/0026103 | A1* | 1/2015 | Goldschmidt | G06N 7/005 706/12 |
| 2015/0106927 | A1* | 4/2015 | Ferragut | H04L 63/1408 726/23 |
| 2018/0337935 | A1* | 11/2018 | Marwah | H04L 63/1425 |

\* cited by examiner

*Primary Examiner* — Paul E Callahan
(74) *Attorney, Agent, or Firm* — Holland & Hart LLP

(57) ABSTRACT

A method for anomaly detection using grouping-based graph summarization is performed by one or more computing devices, each including one or more processors. The method includes identifying a first graph from a stream of incoming graphs, generating a first summary of the first graph, classifying the first summary in a first category, identifying a second graph from the stream of incoming graphs, generating a second summary of the second graph, comparing the first summary with the second summary, mapping the first summary and the second summary to the first category upon determining that the comparing indicates a similarity between the first summary and the second summary satisfies a graph similarity threshold, analyzing a frequency of graphs being mapped to graph categories, the graph categories including at least the first category, and detecting an anomaly in one of the graph categories based at least in part on the analysis.

20 Claims, 9 Drawing Sheets

CLASSIFICATION USING PROJECTION OF GRAPHS INTO SUMMARIZED SPACES

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Analysts may receive incident reports regarding potential malware. However, in some cases, a conventional system may pull in incomplete information or sort through massive amounts of information, or both, resulting in the analyst having difficulty identifying anomalies due to too information or not enough information provided by the conventional system.

SUMMARY

According to at least one embodiment, a method for anomaly detection using grouping-based graph summarization is described. The method may be performed by one or more computing devices where each has one or more processors. The method may include identifying a first graph from a stream of incoming graphs, generating a first summary of the first graph, classifying the first summary in a first category, identifying a second graph from the stream of incoming graphs, generating a second summary of the second graph, comparing the first summary with the second summary, mapping the first summary and the second summary to the first category upon determining that the comparing indicates a similarity between the first summary and the second summary satisfies a graph similarity threshold, analyzing a frequency of graphs being mapped to graph categories, and detecting an anomaly in one of the graph categories based at least in part on the analysis. In some cases, the graph categories may include at least the first category.

In some cases, detecting the anomaly in one of the graph categories may include comparing the frequency of graphs being mapped to the plurality of graph categories, and determining the frequency of graphs being mapped to one of the graph categories satisfies a mapping frequency threshold. The method may include determining whether the anomaly indicates malware and performing a security action to protect the one or more computing devices from the malware upon determining the anomaly indicates malware. The security action may include at least one of quarantining the malware, deleting the malware, scanning the malware, identifying characteristics of the malware, classifying the malware, or any combination thereof. Determining whether the anomaly indicates malware may include analyzing graphs that have been mapped to the graph category having the anomaly and determining, based at least in part on the analysis of the graphs, details about the anomaly.

In some cases, generating the summary of the first graph may include selecting one or more nodes from the first graph and grouping the selected one or more nodes into a supernode. Generating the summary of the first graph may include grouping one or more edges from the first graph corresponding to the selected one or more nodes into a superedge. Selecting of the one or more nodes may be based at least in part on selecting a reduction ratio. In some cases, the selected reduction ratio may determine a ratio of a number of summarized nodes in the summary of the first graph to a total number of nodes in the first graph. A higher reduction ratio may indicate a lower storage size for the summary of the first graph. Selecting of the one or more nodes may be based at least in part on selecting a utility value. In some cases, the selected utility value may determine an extent to which one or more regions of interest of the first graph are preserved in the summary of the first graph. A lower utility value may indicate a lower storage size for the summary of the first graph.

The method may include classifying the second graph in a second category of the plurality of graph categories upon determining that a result of the comparing of the first summary with the second summary does not satisfy the graph similarity threshold. The method may also include identifying a third graph from the stream of incoming graphs, generating a summary of the third graph, and comparing the summary of the third graph to at least one of the first summary and the second summary or both. The method may include mapping the third graph to the first summary upon determining that the comparing indicates a similarity between the first summary and the third summary satisfies the graph similarity threshold. At least one node of the first graph may represent an event associated with a client device or a user of the client device, or an event associated with the client device and the user of the client device.

A computing device configured for anomaly detection using grouping-based graph summarization is also described. The computing device may include a processor, memory in electronic communication with the processor where the memory stores computer executable instructions that when executed by the processor cause the processor to perform the steps of identifying a first graph from a stream of incoming graphs, generating a first summary of the first graph, classifying the first summary in a first category, identifying a second graph from the stream of incoming graphs, generating a second summary of the second graph, comparing the first summary with the second summary, mapping the first summary and the second summary to the first category upon determining that the comparing indicates a similarity between the first summary and the second summary satisfies a graph similarity threshold, analyzing a frequency of graphs being mapped to graph categories, the graph categories including at least the first category, and detecting an anomaly in one of the graph categories based at least in part on the analysis.

A computer-program product for anomaly detection using grouping-based graph summarization is also described. The computer-program product may include a non-transitory computer-readable medium storing instructions thereon. When the instructions are executed by one or more processors, the execution of the instructions may cause the one or more processors to perform the steps of identifying a first graph from a stream of incoming graphs, generating a first summary of the first graph, classifying the first summary in a first category, identifying a second graph from the stream of incoming graphs, generating a second summary of the second graph, comparing the first summary with the second summary, mapping the first summary and the second summary to the first category upon determining that the comparing indicates a similarity between the first summary and the second summary satisfies a graph similarity threshold, analyzing a frequency of graphs being mapped to graph categories, the graph categories including at least the first category, and detecting an anomaly in one of the graph categories based at least in part on the analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
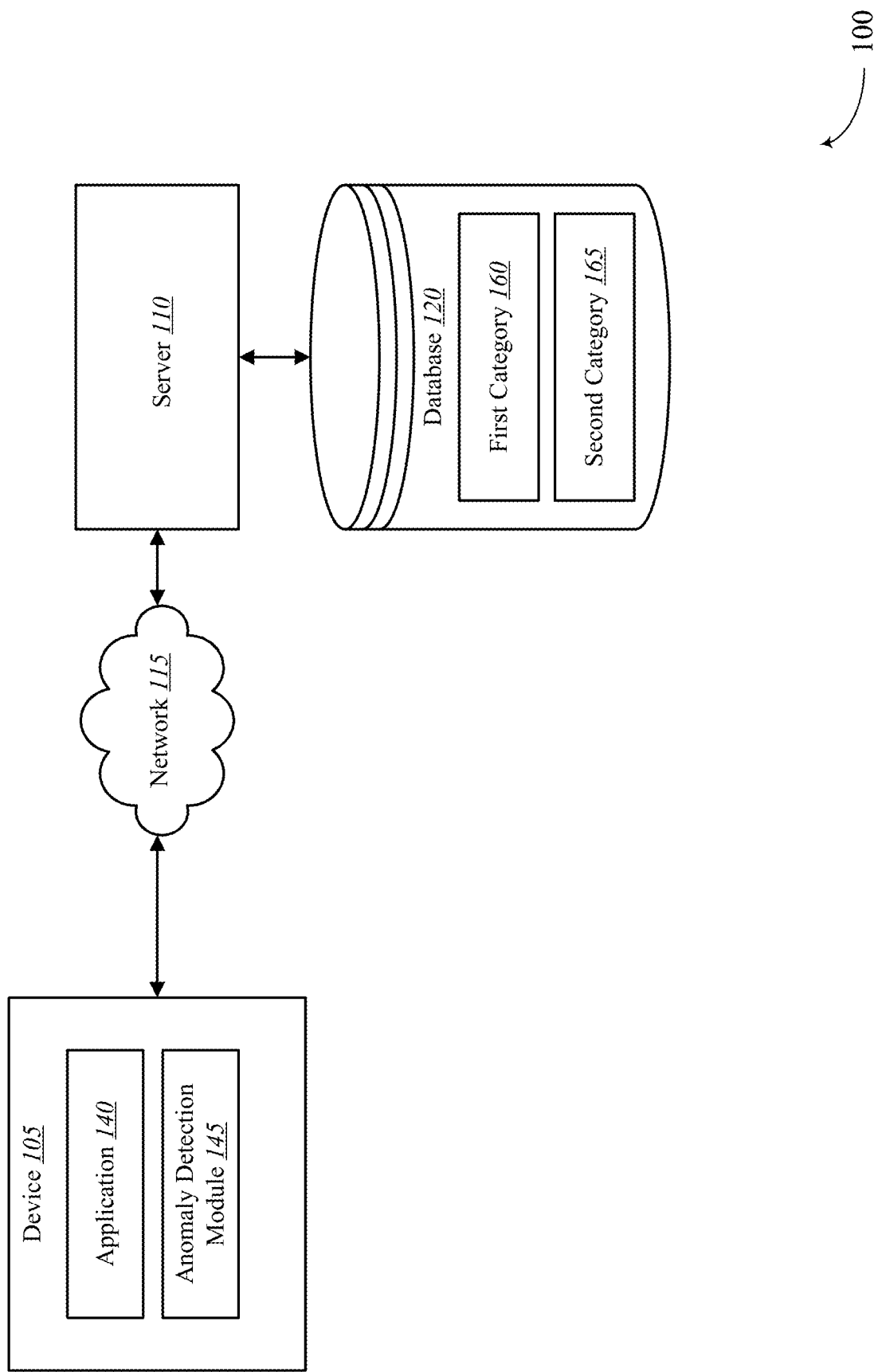
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting anomalies. More specifically, the systems and methods described herein relate to detecting anomalies by using classification with projection of graphs into summarized spaces.

Detecting anomalies may include analyzing graphs from an incoming stream of graphs. Analyzing each graph separately may be tedious, time consuming, and computing energy intensive. In some cases, analyzing each graph separately may involve consuming a large amount of bandwidth and/or be resource intensive. Further, storing each of the graphs and the associated analytics may also consume a large amount of storage resources.

In some cases, the principles described herein may include classifying at least some of the incoming graphs into a smaller number of equivalence classes and then analyzing these classes. This group analysis may effectively cater to a variety of analytical use cases such as predicting unknown graphs, understanding complex structures between different classes, privacy preservation, savings in storage, other advantages, or combinations thereof. The principles described herein may include classifying streaming graphs using projection of graphs into a summarized space as equivalence metrics that cater to classification of monitored events.

Graph classification may include classifying separate, individual graphs in a graph database into at least one graph category from one or more graph categories. Graph summarization may involve making a concise gist of a graph where the graph's nodes are grouped as supernodes and related edges as superedges.

In some examples, the first graph of a stream of incoming graphs is analyzed and a graph summary may be generated of this first graph. In some cases, the first graph summary includes as much detail as is in the first graph. For the second graph in the incoming stream of graphs, a second summary may be generated. In some cases. the second summary may be compared with other graph summaries. For example, the second summary may be compared to at least the first summary. When the second summary matches exactly or approximately (e.g., satisfies a similarity threshold) with the first summary, then the second summary may be mapped to the graph category of the first summary. When the second summary does not exactly match or is not similar enough to the first summary (or another graph summary) then a new category may be created based at least in part on the second summary and the second summary may be mapped to the new category. In some cases, for those incoming graphs that are mapped to an existing category, the incoming graph may be discarded. In some cases, the graph count for the category may be incremented up to a higher graph count each time a summary is mapped to the category. In some cases, the relevant information regarding the number of graphs belonging to a category may be stored in a database locally and/or remotely. These same techniques of generating graph summaries, comparing graph summaries, and mapping graph summaries may be repeated for multiple graphs from a stream of incoming graphs. In some examples, each of the incoming graphs may be subject to these techniques and may receive a summary and be assigned to a category for analysis and anomaly detection and/or another useful task.

In some examples, the graph summary categories and frequency of graphs belonging to the categories may be used to detect anomalies. For example, a graph category may be suspected as an anomaly based on the graph category having a relatively low or relatively high frequency of graph summaries being assigned to the graph category. For example, a frequency or a count of graph summaries mapped to the graph category may satisfy a low frequency threshold or satisfy a high frequency threshold. In one example, a category with a frequency count of graph summary mappings of a category below a predetermined low frequency threshold may be indicative of a particular type of anomaly associated with that category. Similarly, a category with a frequency count above a predetermined upper frequency threshold may be indicative of another type of anomaly associated with that particular category. Thus, one or more frequency count thresholds may be used to identify categories for further analysis to determine finer details of the suspected anomaly (e.g., analysis of the graph summaries and/or graphs associated with the category, analysis of the events associated with graph summaries and/or graphs associated with the category, etc.).

In some cases, the graph classification uses projection of graphs into summarized space as equivalence metric. The granularity of these summaries may be parameterized based at least in part on a compression ratio or based at least in part on a utility, based at least in part on another factor, or combinations thereof. The graphs may be parameterized by their classification (e.g. equivalence metric) by modulating summarization function properties. The issues involved in classifying large numbers of incoming graphs into a smaller number may be addressed by mapping graphs that are the same or similar together to the same category. The similarities may be defined in the summaries of the categories.

When graph summaries s(G_1) and s(G_2) of graphs G_1 and G_2 are equal or sufficiently equal (e.g., satisfy a similarity threshold), then G_1 and G_2 may be said to belong to the same class of graphs. In one example, given an input graph G, the grouping-based graph summarization function s(G) may generate a concise gist of graph G. In some case, one or more sets of two or more nodes may be grouped into supernodes and corresponding edges between two or more supernodes may be grouped into superedges.

In some cases, the summarization function s(G) may be parameterized based at least on one or more factors. One such factor may include a reduction ratio. In some cases, the reduction ratio may be defined as a ratio of the number of summarized nodes in the summary of G (e.g., s(G)) to total number of nodes in G. For example, a ratio value of 0.2 means 20% of the original nodes in G are collapsed into supernodes. Thus, in this case summarization function s(G) retains 80% of the graph G unmodified. Another such factor may include a utility value, which may be defined as the usefulness of s(G) with respect to G. In some cases, the higher the extent to which some regions in G are preserved in the transformed graph, the greater the utility value. In such an example, the utility value may be defined in a range of [0,1].

In some situations, the lower the value of the reduction ratio, the more fine-grained the s(G) function may be. For example, the s(G) function may be closer to graph G in terms of number of nodes and overall structure and vice versa for higher values of the reduction ratio. Also, in some cases, the lower the value of the utility value, the more coarse-grained the s(G) function may be (e.g., s(G) function is relatively concise or compressed). Whereas, higher the utility value, the more fine-grained the s(G) function may be. For example, the s(G) function may be closer to graph G.

In some cases, the graph classification may be based at least in part on defined grouping-based summarization function. For example, for each incoming graph G_i from a relatively large set of incoming graphs {G_1, G_2, G_3, . . . G_n}, a grouping-based summarization function may be applied to calculate the summary s(G_i) for i=1:n (e.g., where n is a positive integer of 2 or greater). In this situation, the system may map G_i to s(G_i). In some cases, multiple graphs may be mapped to a single summary depending on the conciseness of s(G_i). Hence, the overall large space of incoming graphs may be reduced to a lower number of summary graphs. By modulating summarization function properties such as the reduction ratio and the utility value, the graphs may be parameterized by at least the classification or by at least the equivalence metric. In some cases, the more concise the graph summaries are, the lower the number of classes the incoming graphs may be classified into and vice versa.

This present technique has several advantages over conventional graph classification because conventional approaches involve reducing graphs into indiscernible statistics for classification purposes, but are not in a form that is conducive to parameterization since conventional approaches do not preserve structure of the original graphs. Whereas the principles described in the present disclosure preserve the structure of the original graphs through the grouped summaries, which enables storage savings in a device because the present techniques enable the device to store just an equivalent gist of multiple graphs while preserving key structures of the original graphs.

The present techniques maybe applied to any number of graphs, including telemetry forms graphs, etc. For instance, the present techniques may be applied to daily instances of user interaction graphs, device network communications, interactions between two or more devices, social network behavior, etc. Similarly, these techniques may be used to access file data, which may be viewed as streaming incoming graphs where each graph is based on user-file accesses over some time window. The present techniques may be used to reduce the amount of overall user-file access data to be analyzed for an analyst. Moreover, present techniques may be added to enterprise cloud solutions as value added service to aid the detection of anomalous insiders in cloud repositories for enterprise customers. Further, present techniques may be used when given a malicious low-level event trace, and/or to mine an enterprise's flight data recorder logs to identify similar traces. In other examples, the present techniques may be used to contrast the logs produced by two or more cloud devices when the cloud devices are processing different data streams to search for anomalies. In general, the present techniques may be used in anomaly detection, link prediction, privacy preservation, visualization, or analytics, or any combination thereof.

FIG. 1 is a block diagram illustrating one embodiment of an environment 100 in which the present systems and methods may be implemented. In some embodiments, at least some of the systems and methods described herein may be performed by and/or on a device (e.g., at least device 105). As depicted, the environment 100 may include at least device 105. In some embodiments, environment 100 may include server 110, database 120, and a network 115 that allows the device 105, the server 110, and database 120 to communicate with one another.

Examples of the device 105 may include any combination of mobile devices, smart phones, personal computing devices, computers, laptops, desktops, servers, media content set top boxes, switches, routers, other networking devices, or any combination thereof. In some cases, device 105 may include event data of device 105, which may be sent to server 110 over network 115. Examples of server 110 may include any combination of a data server, a cloud server, an automation server, proxy server, mail server, web server, application server, database server, communications server, file server, home server, mobile server, name server, or any combination thereof.

In some configurations, the device 105 may include an application 140 and an anomaly detection module 145. In some cases, device 105 may include one or more user interfaces. In one example, application 140 may include one or more user interfaces. Although the components of the device 105 are depicted as being internal to the device 105, it is understood that one or more of the components may be external to the device 105 and connect to device 105 through wired and/or wireless connections. In some embodiments, application 140 may be installed on a remote computing device in order to allow a remote user to interface with a function of device 105, anomaly detection module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet.

It is noted that in some embodiments, the device 105 may not include an anomaly detection module 145. For example, device 105 may include application 140 that allows device 105 to interface with a remote device via anomaly detection module 145 located on another device such as a remote computing device and/or server 110. In some embodiments, device 105 may include an anomaly detection module 145 where at least a portion of the functions of anomaly detection module 145 are performed separately and/or concurrently on device 105 and/or server 110. Likewise, in some embodiments, a user may access the functions of device 105 (directly or through device 105 via anomaly detection module 145) from a remote computing device. For example, a remote computing device may include a mobile application that interfaces with one or more functions of device 105, anomaly detection module 145, and/or server 110.

In some embodiments, server 110 may be coupled to database 120. Database 120 may be internal or external to the server 110. In one example, devices 105-1 to 105-n may be coupled directly to database 120, database 120 being internal or external to device 105. Database 120 may include a first category 160 of a first set of one or more graph summaries and a second category 165 of a second set of one or more graph summaries. For example, device 105 may access the first category 160 or the second category 165 in database 120 over network 115 via server 110. The first category 160 and/or the second category 165 may include those summaries of the graphs that have been provided to the device 105 or the server 110 through an incoming stream and which have been summarized by the anomaly detection module 145.

In general, the anomaly detection module 145 may identify graphs from a stream of incoming graphs and create summaries for each graph. In response to completing a graph summary, the summaries may be mapped to an existing category when the graph summary is an exact match with the summaries in the existing category or when the graph summaries is similar enough to the summaries in the categories defined by certain characteristics of the graph summary and the summaries in the category. When a certain number of characteristics of the graph summary and the summaries in the category are the same or similar, even though the entire summaries are not exact, the graph summary may qualify based on a similarity threshold to be mapped to an associated graph category. In some examples, multiple graph categories may exist (e.g., more than just the first category 160 and the second category 165). In these types of examples where multiple existing categories are present, a graph summary may be mapped to a category to which the graph summary is most similar to at least one graph summary already mapped to that category.

When the graph summary is not similar to a graph summary of any category, a new category may be generated. In this circumstance, the graph summary may be mapped to the new category. Each of the categories may be parameterized to detect anomalies and/or perform other types of functions.

Figure 2:
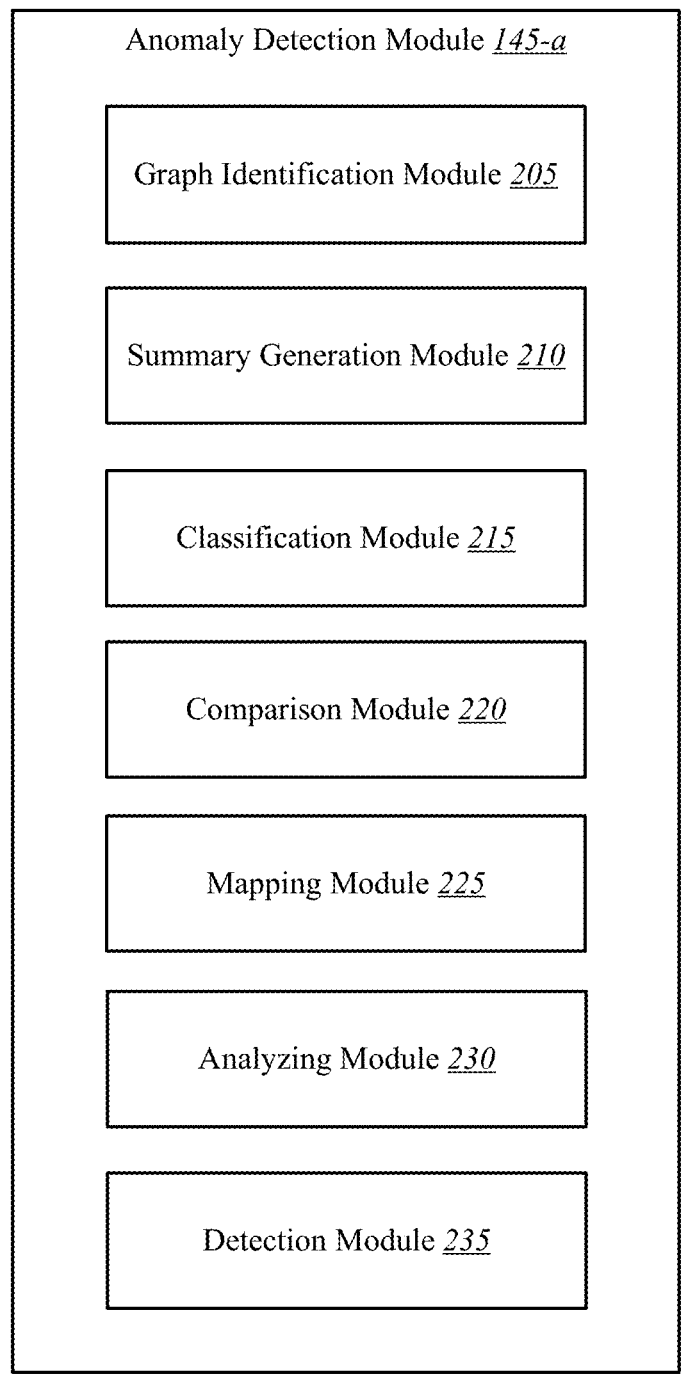
FIG. 2 is a block diagram illustrating one example of an anomaly detection module.

FIG. 2 is a block diagram illustrating one example of an anomaly detection module 145-a. The anomaly detection module 145-a may be one example of the anomaly detection module 145 depicted in FIG. 1. As depicted, the anomaly detection module 145-a may include a graph identification module 205, a summary generation module 210, a classification module 215, a comparison module 220, a mapping module 225, an analyzing module 230, and a detection module 235.

The graph identification module 205 may identify graphs from an incoming stream of graphs. In some cases, the incoming stream of graphs includes at least one graph, at least two graphs, more than three graphs, and so on. In some cases, these graphs may be identified in the sequential order in which the graphs are received. In some cases, the graphs may be identified based on a first-in first-out basis. In some cases, the graphs may be identified on a first-in last out basis. In some cases, the graphs may be identified on a basis where the most recently received graph is the next to be identified. In some examples, the graph identification module 205 identifies a graph and waits until the graph is summarized and categorized before identifying the next graph. In some examples, graph identification module 205 may identify a first graph and then identify a second graph as graph identification module 205 categorizes the first graph.

The summary generation module 210 may summarize the information in each of the identified graphs. The summary generation module 210 may preserve at least a portion of detail in the identified graphs. In some examples, the summaries may include a fine-grain amount of detail. Yet, in other examples, the summaries may include a coarse-grain amount of detail. The information that is similar to the graphs within the category may be superimposed so that just a minimum of data is lost in the graph summaries. In some cases, two or more nodes in at least one graph may be combined into a supernode. Similarly, one or more edges in at least one graph may be combined to make a superedge. In some cases, a superedge may connect a first supernode to one or more other nodes. Additionally or alternatively, a superedge may connect a first supernode to one or more supernodes. In some cases, a regular edge may connect a first supernode to one or more other nodes. Additionally or alternatively, a regular edge may connect a first supernode to one or more supernodes.

In some cases, the classification module 215 may classify the summary of the first graph to create a category. Likewise, when a subsequent summary of an identified graph does not include a category that is similar enough to the subsequent summary, the classification module 215 may classify the subsequent summary into a new category.

In some cases, the comparison module 220 may compare graph summaries of subsequent graphs to with the graph summaries that are already mapped to a created category. In some cases, the comparison module 220 may compare like features between the summaries to determine how similar the graphs are between each other. In some cases, the comparison module 220 may determine that the summaries are exact matches. In some examples, the comparison module 220 may determine the graph summaries are similar enough to each other to be mapped to the same category based on a similarity threshold. In some cases, the comparison module 220 may determine that the summaries are not similar enough to be mapped together.

In some cases, the mapping module 225 may map the summaries that are exact matches or at least similar enough to each other based on the comparing performed by the comparison module 220. In some cases, the mapping module 225 may map the summaries to the category with which the summary is most similar in those cases where the summary has similarities when multiple categories exists. In some cases, the mapping module 225 may map the summary to a new category if the summary is not similar enough to the existing categories. In one example, the mapping module 225 may map the first summary and the second summary to the first category upon determining that the comparing indicates a similarity between the first summary and the second summary satisfies a graph similarity threshold.

In some cases, the analyzing module 230 may parameterize information about the graph summaries to learn details about events associated with graph summaries in the categories. For example, the analyzing module 230 may count the number of graph summaries that are mapped to each of the categories and/or monitor a frequency at which graph summaries are mapped to particular categories.

The detection module 235 may detect anomalies based on the analysis performed by the analyzing module 230. In one example, the detection module 235 may derive an expected frequency count for each of the categories. The frequency count may be a count per time unit, a count per usage, a count per location, a count by another metric, or combinations thereof. In some cases, the frequency count is the frequency at which graph summaries are mapped to a particular category. Additionally or alternatively, the frequency count may be the overall count of graph summaries mapped to a particular category. In some cases, the frequency count may be determined by how many graphs are added to a category per unit of time. In some cases, the frequency count may be determined by how many graphs are added to a specific category independent of time. In some cases, when the frequency count crosses a threshold number of graph summaries being assigned to a particular category, an analysis may be triggered. In other examples where the frequency count is defined in part by a unit of time, an analysis may be triggered when the threshold frequency count number is reach within a predefined time unit.

In some cases, a first category may have a first upper frequency threshold at which an anomaly is triggered, and a second category may have a second upper frequency threshold at which an anomaly is triggered, where the second upper frequency threshold is different than the first upper frequency threshold. For example, the first upper frequency threshold may trigger an anomaly when the frequency of summaries being mapped to the first category exceeds 10 per minute, while the second upper frequency threshold may trigger an anomaly when the frequency of summaries being mapped to the second category exceeds 7 per minute, etc.

The expected frequency count may be described within a range. In some examples, the range is based off a statistical bell curve based on the prior history of the network. In some cases, the range may be defined by a low frequency threshold on one side of the range, and a high frequency threshold on the other side of the range. In those cases where the actual frequency count is below the low frequency threshold, the detection module 235 may identify an anomaly and initiate additional processing to understand the details of the anomaly. Similarly, in those cases where the actual frequency count is above the high frequency threshold, the detection module 235 may identify an anomaly and initiate additional analysis to determine further details of the anomaly. In some cases, the additional analysis may identify the anomaly as malware and cause a security action to be executed to prevent loss or damage to data on an associated device and/or damage to the device.

Figure 3:
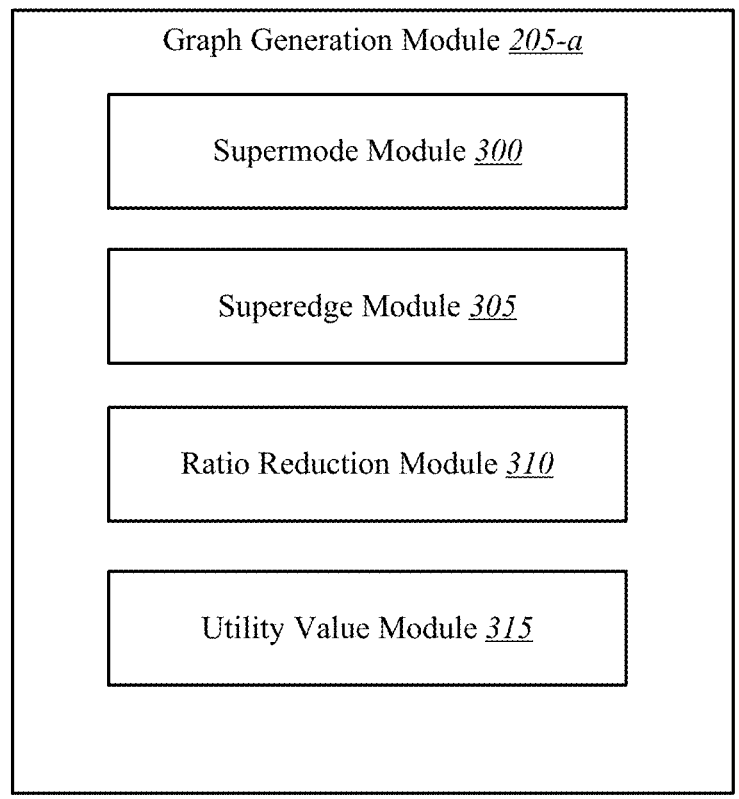
FIG. 3 is a block diagram illustrating one example of graph generation module.

FIG. 3 is a block diagram illustrating one example of a graph identification module 205-a. The graph identification module 205-a may be one example of graph identification module 205 depicted in FIG. 2. As depicted, the graph identification module 205-a may include a supernode module 300, a superedge module 305, a ratio reduction module 310, and a utility value module 315.

The supernode module 300 may select at least two nodes that may be combined together into a more coarse-grained supernode. By reducing the number of nodes in the graph, the graph summary may retain some information of the original graph while reducing the total amount of detail included in the summary. In some cases, some information may be lost, but the overall structure of the graph may be preserved.

In some cases, the superedge module 305 may select one or more sets of edges between nodes (two or more edges per set) to be combined into superedges. By preserving at least some of the original edges and/or nodes from the original graph, at least some of the structure of the original graphs may be preserved.

In some cases, the ratio reduction module 310 may determine the ratio between the number of original nodes in the original graphs that have been collapsed into the number of new supernodes. In some cases, the target reduction ratio may be based at least in part on the desired detail level in the summaries. For example, the target reduction ratio may be determined based at least in part on a ratio of a number of summarized nodes in the graph summary to a total number of nodes in the corresponding graph. Further, the target reduction ratio may be based at least on part of the desired storage space that each summary is to need. For example, the higher the reduction ratio, the lower needed storage size for the graph summaries.

In some cases, the utility value module 315 may create a graph summary based on a target utility of the graph summaries. Selecting the nodes to collapse may be based at least in part on selecting a utility value where the selected utility value may determine the extent to which one or more regions of interest of the graph are preserved in the graph summary of the first graph. In some cases, the utility measurement may indicate the usefulness of graph summary with respect to the original graph. In some cases, the higher the extent to which the desired regions in graph are preserved in the graph summary, the greater the utility of the graph summary may be. In some cases, the lower the utility value, the lower the amount of storage size may be for the summary of the corresponding graph.

Figure 4:
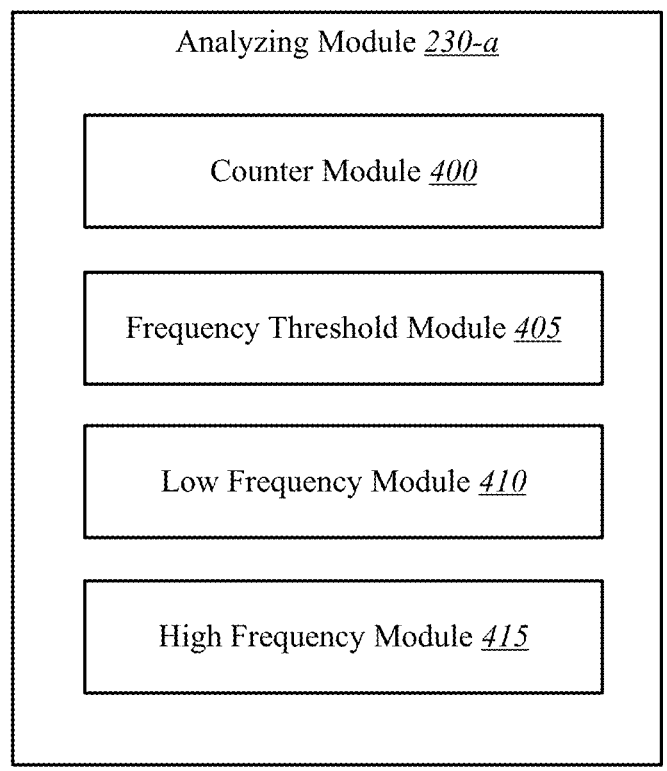
FIG. 4 is a block diagram illustrating one example of an analyzing module.

FIG. 4 is a block diagram illustrating one example of an analyzing module 230-a. The analyzing module 230-a may be one example of the analyzing module 230 depicted in FIG. 2. As depicted, the analyzing module 230-a may include a counter module 400, a frequency threshold module 405, a low frequency module 410, and a high frequency module 415.

In some cases, the counter module 400 may count the frequency at which graph summaries are mapped to specific categories. In some cases, the count may be based on a number of graphs added per time unit, per geography network, per network usage, per device usage, per another parameter, or combinations thereof.

In some cases, the frequency threshold module 405 may be learned over time based at least in part on historical usage of the network. However, in other examples, the frequency threshold may be developed based on other factors. In some cases, the frequency threshold module 405 determines a high frequency threshold and a low frequency threshold.

In some cases, the low frequency module 410 may indicate when the frequency of summaries mapped to the category is less than the low frequency threshold. In response to this type of situation, the low frequency module 410 may consider the low frequency count to be an anomaly and cause an investigation to initiate to determine whether the anomaly is a malware or a result of malware.

In some cases, the high frequency module 415 may indicate when the frequency of summaries mapped to the category is higher than the high frequency threshold. In response to this type of situation, the high frequency module 415 may consider the high frequency count to be an anomaly and cause an investigation to initiate to determine whether the anomaly is malware or a result of malware.

Figure 5:
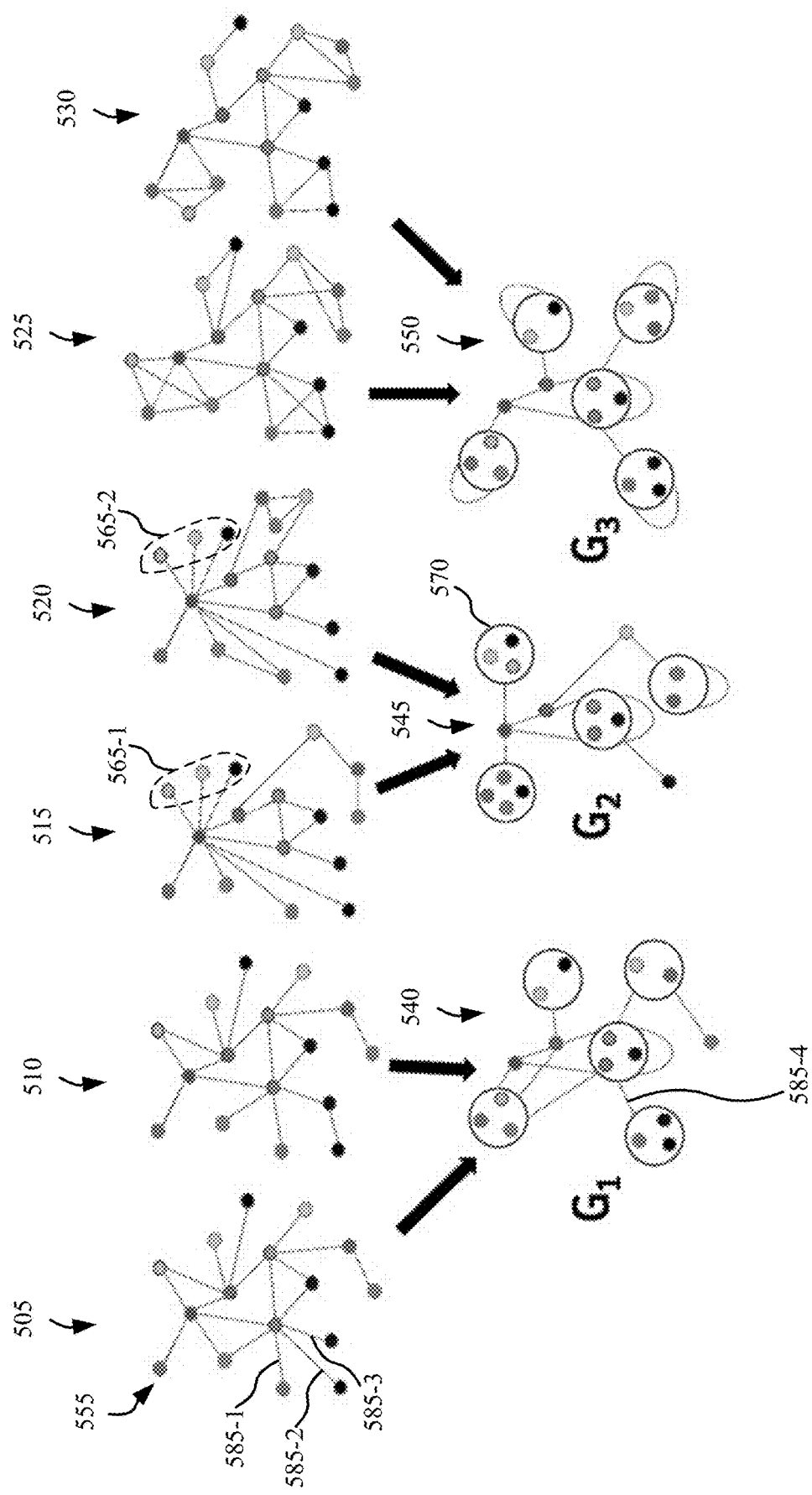
FIG. 5 is a block diagram illustrating an example of graph summaries.

FIG. 5 is a diagram illustrating examples of graphs 505, 510, 515, 520, 525, 530, and graph summaries 540, 545, 550. Each of the graphs 505, 510, 515, 520, 525, 530 may include a plurality of nodes (e.g., plurality of nodes 555 of graph 505) that are connected by edges. In some examples, at least one of graphs 505, 510, 515, 520, 525, 530 represent events associated with devices and/or users of a computer network. In some applications, at least one of the graphs 505, 510, 515, 520, 525, 530 may represent events associated with data networking communications between two or more devices, information systems, data organizations, flow of computations within one or more devices, flow of computations between two or more devices, biological systems, social systems, or combinations thereof.

The nodes 555 may present any appropriate type of information. A non-exhaustive list of information that may be represented by the nodes of graphs 505, 510, 515, 520, 525, and/or 530 includes, but is not limited to, a device in a network, an event associated with a client device, an event associated with a user of the client device, an event associated with both the client device and the user of the client device, another type of event, entities, or combinations thereof. The edges may represent any appropriate type of information. In some examples, a non-exhaustive list of information that may be represented by the edges may include, but is not limited to, communications between a first device and at least a second device, a connection between devices (e.g. wires, wireless signals, fiber optic cables, other types of cables, other types of connections), undirected links between devices, directed links between devices, pathways, other types of information, or combinations thereof.

The graphs 505, 510, 515, 520, 525, 530 may be summarized and grouped into categories where the summaries are the same or are similar enough to be classified as the same based on a similarity threshold. In the examples depicted in FIG. 5, graph 505 and graph 510 are classified into a first category based on having the same or similar graph summary 540. Similarly, graph 515 and graph 520 are classified into a first category based on having the same or similar graph summary 545. Also, graph 525 and graph 530 are classified into a first category based on having a same or similar graph summary 550.

The graph summaries 540, 545, 550 may include supernodes that represent portions of nodes of corresponding graphs, where the graphs are determined to be the same or at least sufficiently similar. For example, the analyzing module 230 may analyze graph 515 and graph 520 and determine that one or more nodes from each graph are the same or similar based on a threshold of node/edge similarity. In one example, the supernode module 300 may determine that node group 565-1 of graph 515 includes nodes that are the same or similar to the nodes in node group 565-2 of graph 520. Accordingly, supernode module 300 may group the nodes from node group 565-1 and the nodes from node group 565-2 into supernode 570 in graph summary 540.

Further, the superedge module 305 combine at least some of the edges. For example, edge 585-1, edge 585-2, and edge 585-3 all of graph 505 may be combined into a superedge 585-4 of graph summary 540. Further, the edges that connect the nodes in the graph may be combined to form superedges in the graph summaries. In some cases, these superedges connect nodes and/or supernodes.

Figure 6:
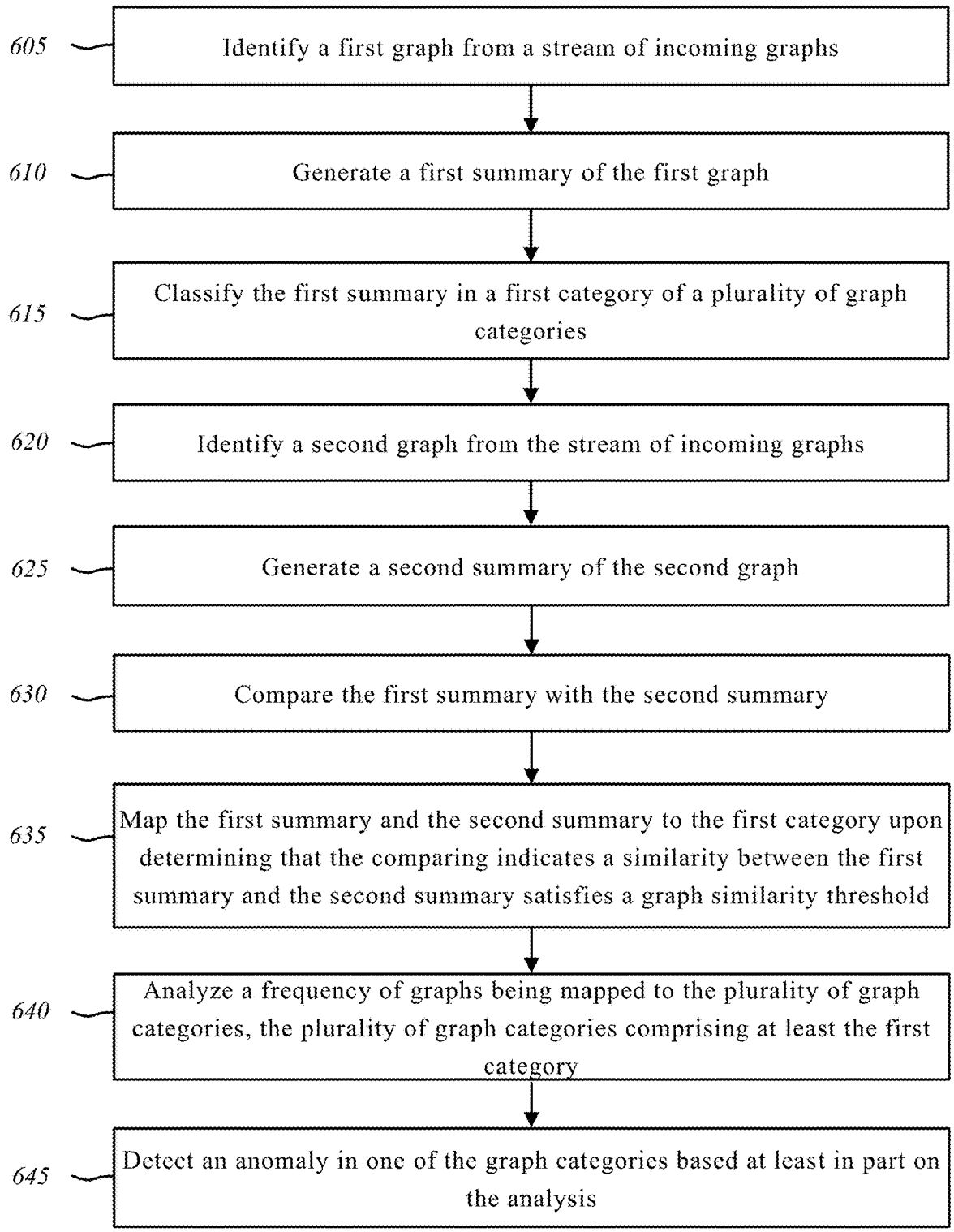
FIG. 6 is a flow diagram illustrating one embodiment of a method for anomaly detection.

FIG. 6 is a flow diagram illustrating one embodiment of a method 600 for detecting anomalies. In some configurations, the method 600 may be implemented by the anomaly detection module 145 illustrated in FIG. 1 or 2. In some configurations, the method 600 may be implemented in conjunction with the application 140 illustrated in FIG. 1.

At block 605, the method 600 may include identifying a first graph from a stream of incoming graphs. The graphs may represent events of a network, devices in a network, other parameters of a network, other types of information, or combinations thereof. The graphs may represent information based on nodes that are connected by edges.

At block 610, the method 600 may include generating a first summary of the first graph. In some examples, the summary reduces the number of nodes in the graph to supernodes in the summary. In some cases, the method 600 may reduce the amount of information in the summary while preserving details about areas of interest in the graphs.

At block 615, method 600 may include classifying the first summary into a first category of a plurality of graph categories. In some cases, this classification is a first category to which subsequent graph summaries may be assigned if the subsequent graph summaries are the same or similar enough to the first graph summary.

At block 620, method 600 may include identifying a second graph from the stream of incoming graphs. The second graph may be identified in a similar manner to how the first graph was identified, or the second graph may be identified by a different mechanism than how the first graph was identified.

At block 625, method 600 may include generating a second graph summary based on the second graph. The second summary may be generated in the same or a different manner than how the first graph summary was generated.

At block 630, method 600 may include comparing the first summary with the second summary. The similarities and dissimilarities may be identified between the first summary and the second summary.

At block 635, method 600 may include mapping the first summary and the second summary to the first category upon determining that the comparing indicates a similarity between the first summary and the second summary satisfies a graph similarity threshold. The graph similarity threshold may involve at least a portion of the first summary and the second summary being the same. In some cases, some information from the graphs is lost as the summaries are generated. In this situation, first and second summaries that are an exact match may not be based on graphs that are exact matches.

At block 640, method 600 may include analyzing a frequency of graphs being mapped to the plurality of graph categories where the plurality of graph categories includes at least the first category. The frequency may be analyzed to determine whether the number of summaries mapped to a particular category is less than the number expected. Similarly, the frequency may be analyzed to determine whether the number of summaries mapped to a particular category is higher than the number expected.

At block 645, method 600 may include detecting an anomaly in one of the graph categories based at least in part on the analysis. In some cases, if the actual frequency count is less than expected or higher than expected, the method may detect an anomaly. A further investigation into the reasons behind the anomaly may indicate malware or a condition that is the result of malware. In response to determining the presence of malware, the method may further include executing a security action.

Figure 7:
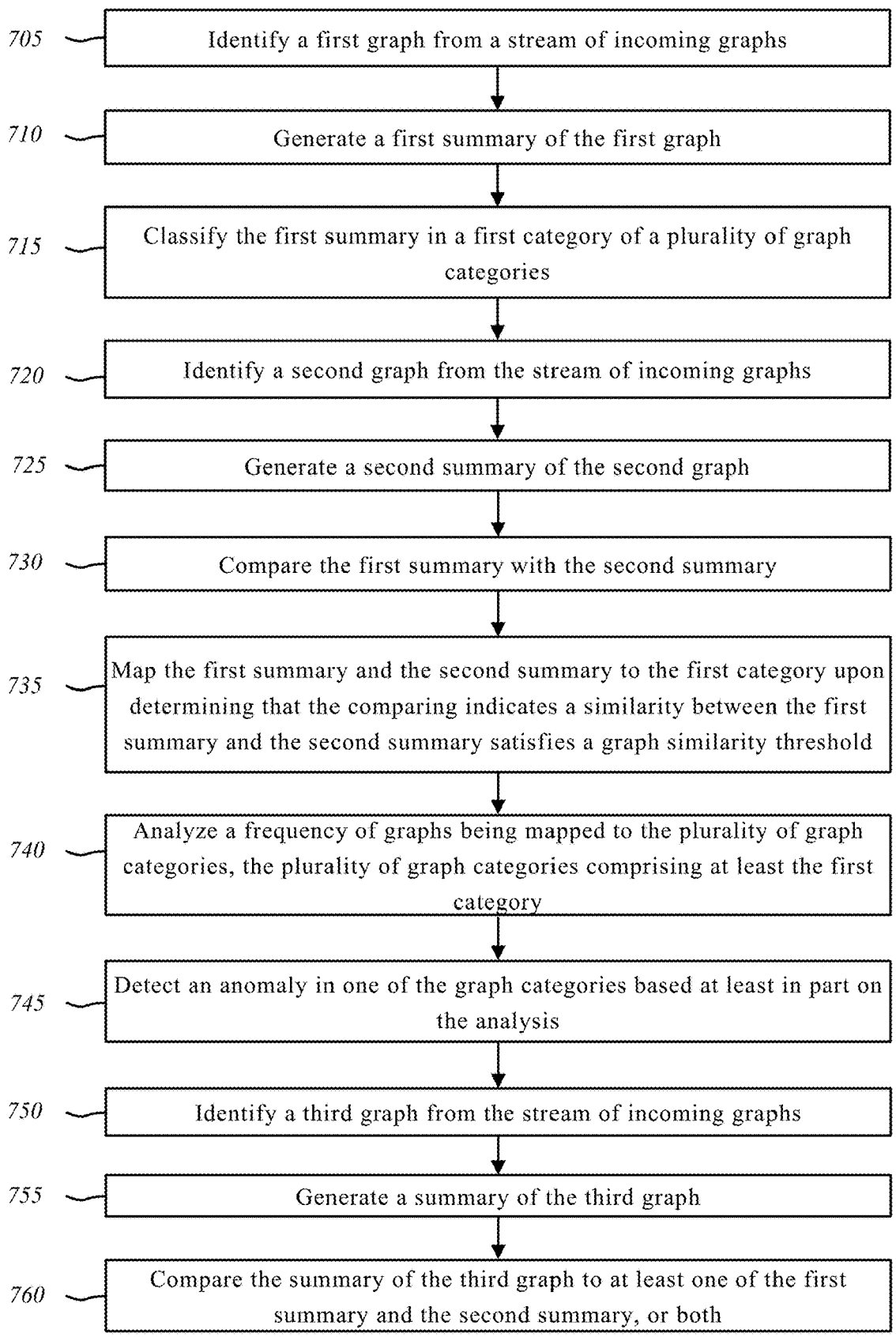
FIG. 7 is a flow diagram illustrating one embodiment of a method for anomaly detection.

FIG. 7 is a flow diagram illustrating one embodiment of a method 700 for detecting anomalies. In some configurations, the method 600 may be implemented by the anomaly detection module 145 illustrated in FIG. 1 or 2. In some configurations, the method 600 may be implemented in conjunction with the application 140 illustrated in FIG. 1.

At block 705, the method 700 may include identifying a first graph from a stream of incoming graphs. The graphs may represent events of a network, devices in a network, other parameters of a network, other types of information, or combinations thereof. The graphs may represent information based on nodes that are connected by edges.

At block 710, method 700 may include generating a first summary of the first graph. In some examples, the summary reduces the number of nodes in the graph to supernodes in the summary. This may reduce the amount of information in the summary while preserving details about areas of interest in the graphs.

At block 715, method 700 may include classifying the first summary into a first category of a plurality of graph categories. In some cases, this classification is a first category to which subsequent graph summaries may be assigned if the subsequent graph summaries are similar enough to the first graph summary.

At block 720, method 700 may include identifying a second graph from the stream of incoming graphs. The second graph may be identified in a similar manner to how the first graph was identified, or the second graph may be identified by a different mechanism than how the first graph was identified.

At block 725, method 700 may include generating a second graph summary based on the second graph. The second summary may be generated in the same or a different manner than how the first graph summary was generated.

At block 730, method 700 may include comparing the first summary with the second summary. The similarities and dissimilarities may be identified between the first summary and the second summary.

At block 735, method 700 may include mapping the first summary and the second summary to the first category upon determining that the comparing indicates a similarity between the first summary and the second summary satisfies a graph similarity threshold. The graph similarity threshold may involve at least a portion of the first summary and the second summary being the same. In some cases, some information from the graphs is lost as the summaries are generated. In this situation, first and second summaries that are an exact match may not be based on graphs that are exact matches.

At block 740, method 700 may include analyzing a frequency of graphs being mapped to the plurality of graph categories where the plurality of graph categories includes at least the first category. The frequency may be analyzed to determine whether the number of summaries mapped to a particular category is less than the number expected. Similarly, the frequency may be analyzed to determine whether the number of summaries mapped to a particular category is higher than the number expected.

At block 745, method 700 may include detecting an anomaly in one of the graph categories based at least in part on the analysis. In some cases, if the actual frequency count is less than expected or higher than expected, the method may detect an anomaly. A further investigation into the reasons behind the anomaly may indicate malware or a condition that is the result of malware. In response to determining the presence of malware, the method may further include executing a security action.

At block 750, method 700 may include identifying a third graph from the stream of incoming graphs. The third graph may be identified in a similar manner to how the first graph or the second graph was identified, or the third graph may be identified by a different mechanism than how the first graph or the second graph were identified.

At block 755, method 700 may include generating a third graph summary based on the third graph. The third summary may be generated in the same or a different manner than how the first graph summary or the second graph summary was generated.

At block 760, method 700 may include comparing the third summary with at least one of the first graph summary and the second summary or both. The similarities and dissimilarities may be identified between the first summary, the second summary, and the third summary.

Figure 8:
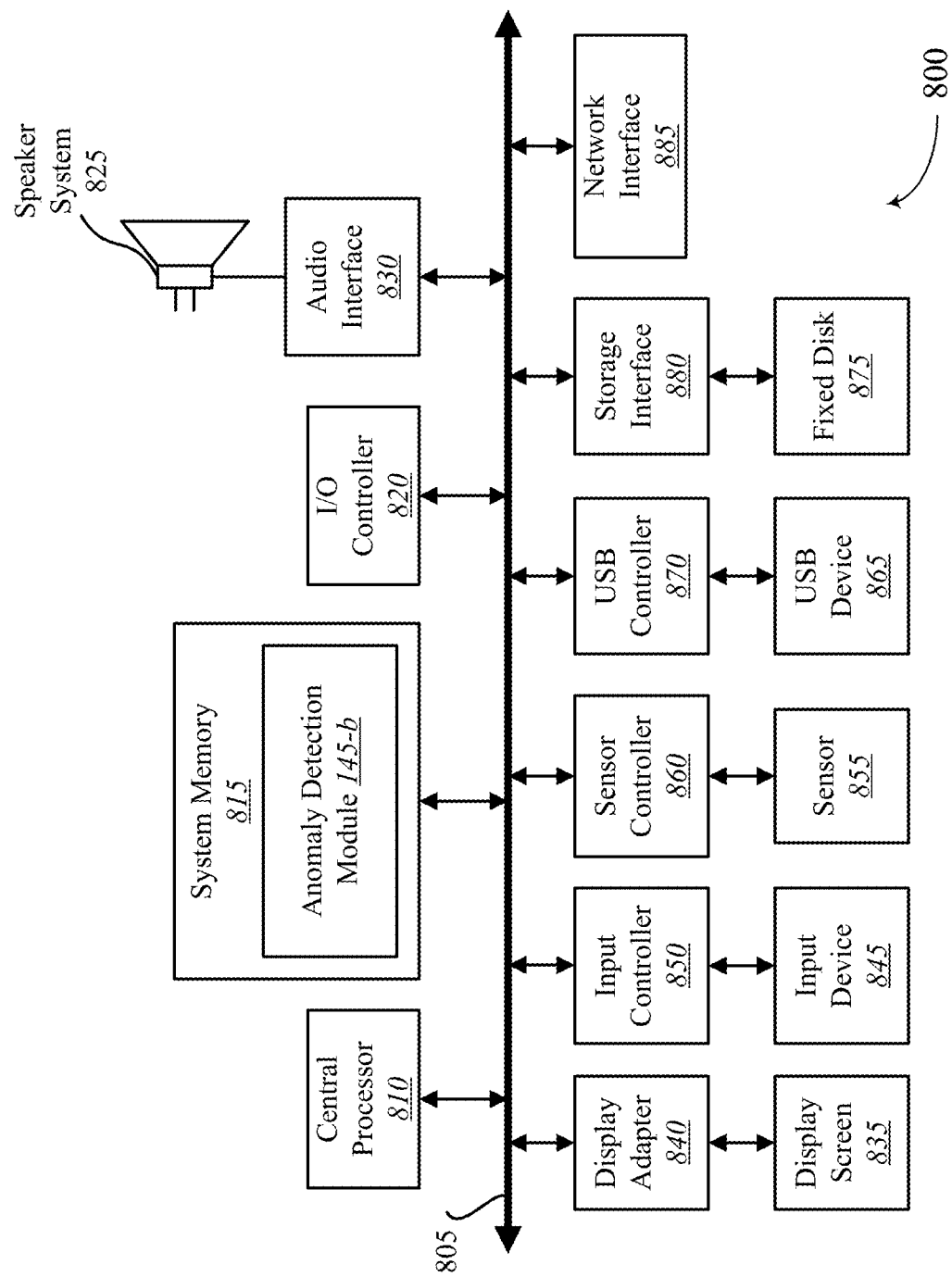
FIG. 8 depicts a block diagram of an example of a computer system suitable for implementing the present systems and methods.

FIG. 8 depicts a block diagram of a computing device 800 suitable for implementing the present systems and methods. The device 800 may be an example of device 105, and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. For example, the anomaly detection module 145-b to implement the present systems and methods may be stored within the system memory 815. Applications (e.g., application 140) resident with device 800 are generally stored on and accessed via a non-transitory computer readable medium, such as a hard disk drive (e.g., fixed disk 875) or other storage medium. Additionally, applications may be in the form of electronic signals modulated in accordance with the application and data communication technology when accessed via interface 885.

Storage interface 880, as with the other storage interfaces of device 800, may connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems may be interconnected in different ways from that shown in FIG. 8. The aspect of some operations of a system such as that shown in FIG. 8 are readily known in the art and are not discussed in detail in this application. Code to implement the present disclosure may be stored in a non-transitory computer-readable medium such as one or more of system memory 815 or fixed disk 875. The operating system provided on device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 885 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 820 may operate in conjunction with network interface 885 and/or storage interface 880. The network interface 885 may enable system 800 with the ability to communicate with client devices (e.g., device 105 of FIG. 1), and/or other devices over the network 115 of FIG. 1. Network interface 885 may provide wired and/or wireless network connections. In some cases, network interface 885 may include an Ethernet adapter or Fibre Channel adapter. Storage interface 880 may enable system 800 to access one or more data storage devices. The one or more data storage devices may include two or more data tiers each. The storage interface 880 may include one or more of an Ethernet adapter, a Fibre Channel adapter, Fibre Channel Protocol (FCP) adapter, a SCSI adapter, and iSCSI protocol adapter.

Figure 9:
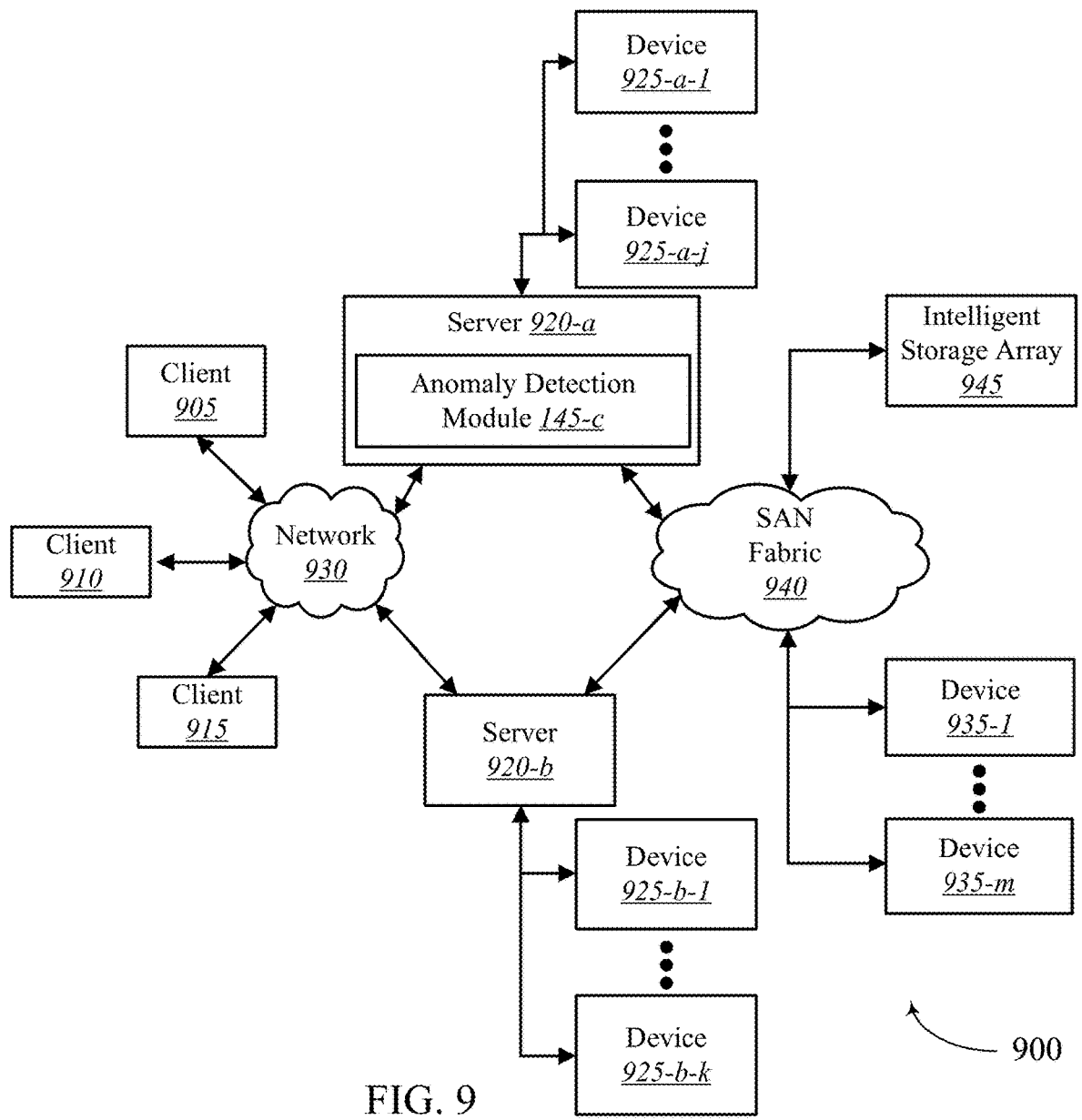
FIG. 9 depicts a block diagram of an example of a computer system suitable for implementing the present systems and methods.

FIG. 9 is a block diagram depicting a network architecture 900 in which client systems 905, 910 and 915, as well as storage servers 920-a and 920-b (any of which may be implemented using computer system 800), are coupled to a network 930. In one embodiment, anomaly detection module 145-c may be located within one of the storage servers 920-a, 920-b to implement the present systems and methods. anomaly detection module 145-c may be one example of anomaly detection module 145 depicted in FIGS. 1, 2, and/or 8. The storage server 920-a is further depicted as having storage devices 925-a-l through 925-a-j directly attached, and storage server 920-b is depicted with storage devices 925-b-l through 925-b-k directly attached. SAN fabric 940 supports access to storage devices 935-1 through 935-m by storage servers 920-a and 920-b, and so by client systems 905, 910 and 915 via network 930. Intelligent storage array 945 is also shown as an example of a specific storage device accessible via SAN fabric 940.

With reference to computer system 800, network interface 885 or some other method may be used to provide connectivity from each of client computer systems 905, 910 and 915 to network 930. Client systems 905, 910 and 915 are able to access information on storage server 920-a or 920-b using, for example, a web browser or other client software (not shown). Such a client allows client systems 905, 910 and 915 to access data hosted by storage server 920-a or 920-b or one of storage devices 925-a-l to 925-a-j, 925-b-l to 925-b-k, 935-1 to 935-m or intelligent storage array 945. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for anomaly detection using grouping-based graph summarization, the method being performed by one or more computing devices, each comprising one or more processors, the method comprising:
   identifying a first graph from a stream of incoming graphs;
   generating a first summary of the first graph;
   classifying the first summary in a first category of a plurality of graph categories;
   identifying a second graph from the stream of incoming graphs;
   generating a second summary of the second graph;
   comparing the first summary with the second summary;
   mapping the first summary and the second summary to the first category upon determining that the comparing indicates a similarity between the first summary and the second summary satisfies a graph similarity threshold;
   analyzing a frequency of graphs being mapped to the plurality of graph categories, the plurality of graph categories comprising at least the first category; and
   detecting an anomaly in one of the graph categories based at least in part on the analysis.

2. The method of claim 1, further comprising:
   determining whether the anomaly indicates malware; and
   performing a security action to protect the one or more computing devices from the malware upon determining the anomaly indicates malware, the security action including at least one of quarantining the malware, deleting the malware, scanning the malware, identifying characteristics of the malware, classifying the malware, or any combination thereof.

3. The method of claim 2, determining whether the anomaly indicates malware further comprising:
   analyzing graphs that have been mapped to the graph category having the anomaly; and
   determining, based at least in part on the analysis of the graphs, details about the anomaly.

4. The method of claim 1, detecting the anomaly in one of the graph categories further comprising:
   comparing the frequency of graphs being mapped to the plurality of graph categories; and
   determining the frequency of graphs being mapped to the one of the graph categories satisfies a mapping frequency threshold.

5. The method of claim 1, wherein generating the summary of the first graph comprises:
   selecting one or more nodes from the first graph; and
   grouping the selected one or more nodes into a supernode.

6. The method of claim 5, generating the summary of the first graph further comprises:
   grouping one or more edges from the first graph corresponding to the selected one or more nodes into a superedge.

7. The method of claim 5, wherein the selecting of the one or more nodes is based at least in part on selecting a reduction ratio, the selected reduction ratio determining a ratio of a number of summarized nodes in the summary of the first graph to a total number of nodes in the first graph.

8. The method of claim 7, wherein a higher the reduction ratio, a lower a storage size for the summary of the first graph.

9. The method of claim 5, wherein the selecting of the one or more nodes is based at least in part on selecting a utility value, the selected utility value determining an extent to which one or more regions of interest of the first graph are preserved in the summary of the first graph.

10. The method of claim 9, wherein a lower the utility value, a lower a storage size for the summary of the first graph.

11. The method of claim 1, further comprising:
   classifying the second graph in a second category of the plurality of graph categories upon determining that a result of the comparing of the first summary with the second summary does not satisfy the graph similarity threshold.

12. The method of claim 1, further comprising:
   identifying a third graph from the stream of incoming graphs;

generating a summary of the third graph; and
comparing the summary of the third graph to at least one of the first summary and the second summary, or both.

13. The method of claim 12, further comprising:
mapping the third graph to the first summary upon determining that the comparing indicates a similarity between the first summary and the third summary satisfies the graph similarity threshold.

14. The method of claim 1, wherein at least one node of the first graph represents an event associated with a client device or a user of the client device, or an event associated with the client device and the user of the client device.

15. A computing device configured for anomaly detection using grouping-based graph summarization, comprising:
a processor;
memory in electronic communication with the processor, wherein the memory stores computer executable instructions that when executed by the processor cause the processor to perform the steps of:
identifying a first graph from a stream of incoming graphs;
generating a first summary of the first graph;
classifying the first summary in a first category of a plurality of graph categories;
identifying a second graph from the stream of incoming graphs;
generating a second summary of the second graph;
comparing the first summary with the second summary;
mapping the first summary and the second summary to the first category upon determining that the comparing indicates a similarity between the first summary and the second summary satisfies a graph similarity threshold;
analyzing a frequency of graphs being mapped to the plurality of graph categories, the plurality of graph categories comprising at least the first category; and
detecting an anomaly in one of the graph categories based at least in part on the analysis.

16. The device of claim 15, wherein the executable instructions when executed cause the processor to perform the step of:
determining whether the anomaly indicates malware; and
performing a security action to protect one or more computing devices from the malware upon determining the anomaly indicates malware, the security action including at least one of quarantining the malware, deleting the malware, scanning the malware, identifying characteristics of the malware, classifying the malware, or any combination thereof.

17. The device of claim 16, wherein the executable instructions when executed cause the processor to perform the step of:
analyzing graphs that have been mapped to the graph category having the anomaly; and
determining, based at least in part on the analysis of the graphs, details about the anomaly.

18. The device of claim 15, wherein the executable instructions when executed cause the processor to perform the step of:
comparing the frequency of graphs being mapped to the plurality of graph categories; and
determining the frequency of graphs being mapped to the one of the graph categories satisfies a mapping frequency threshold.

19. The device of claim 15, wherein the executable instructions when executed cause the processor to perform the step of:
classifying the second graph in a second category of the plurality of graph categories upon determining that a result of the comparing of the first summary with the second summary does not satisfy the graph similarity threshold.

20. A computer-program product for using customer context to detonate malware, the computer-program product comprising a non-transitory computer-readable medium storing instructions thereon, the instructions being executable by a processor to:
identify a first graph from a stream of incoming graphs;
generate a first summary of the first graph;
classify the first summary in a first category of a plurality of graph categories;
identify a second graph from the stream of incoming graphs;
generate a second summary of the second graph;
compare the first summary with the second summary;
map the first summary and the second summary to the first category upon determining that the comparing indicates a similarity between the first summary and the second summary satisfies a graph similarity threshold;
analyze a frequency of graphs being mapped to the plurality of graph categories, the plurality of graph categories comprising at least the first category; and
detect an anomaly in one of the graph categories based at least in part on the analysis.

* * * * *